Figure 1:
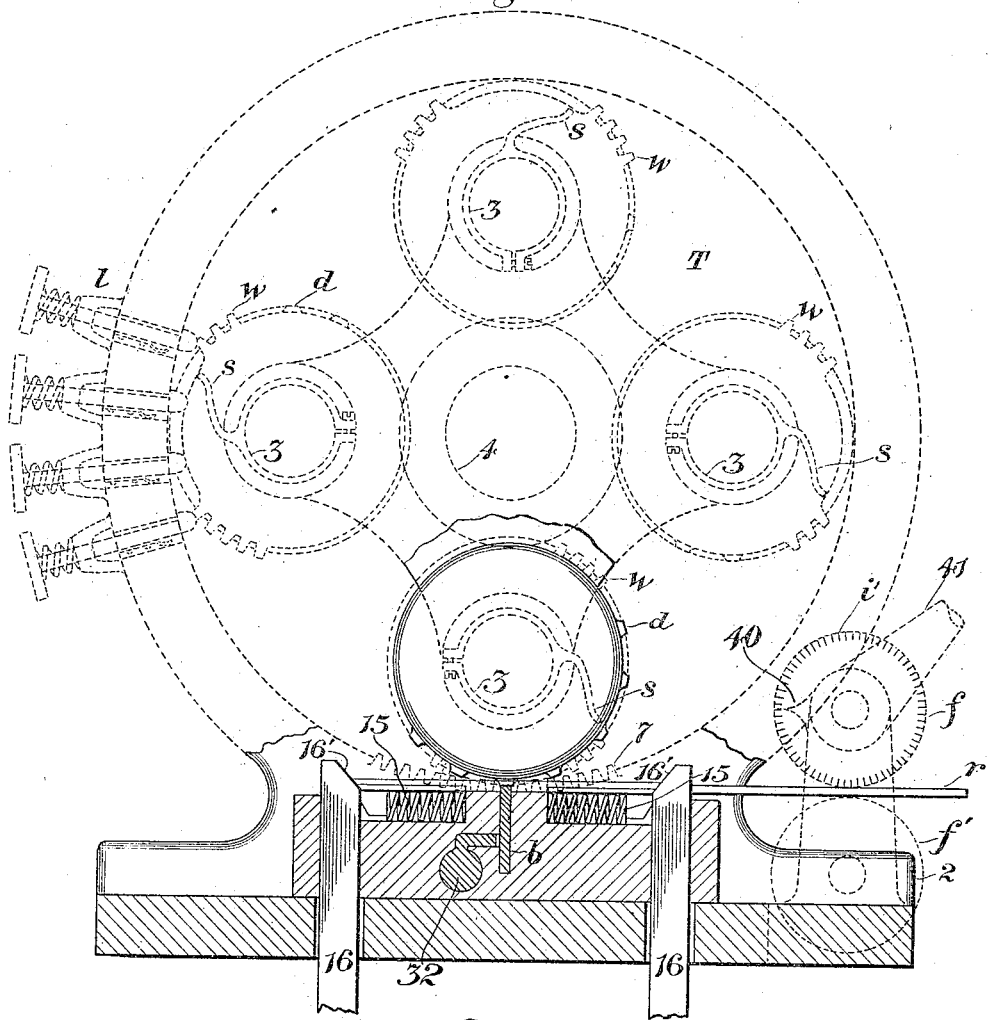

F. H. RICHARDS.
MACHINE FOR FORMING TYPE BARS.
APPLICATION FILED MAY 3, 1900. RENEWED SEPT. 19, 1908.

947,005.

Patented Jan. 18, 1910.

3 SHEETS—SHEET 1.

Witnesses:

Inventor,
F. H. Richards

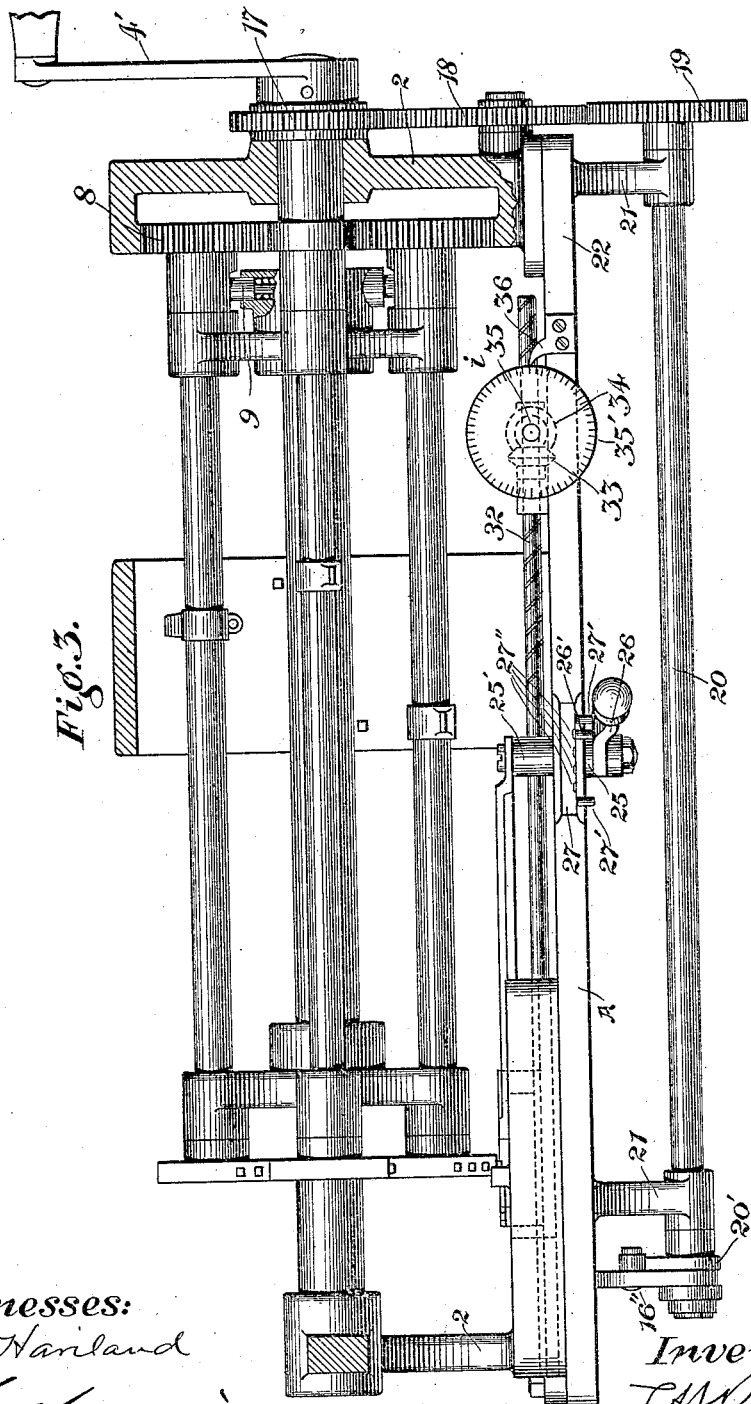

F. H. RICHARDS.
MACHINE FOR FORMING TYPE BARS.
APPLICATION FILED MAY 3, 1900. RENEWED SEPT. 19, 1908.
947,005.
Patented Jan. 18, 1910.
3 SHEETS—SHEET 3.
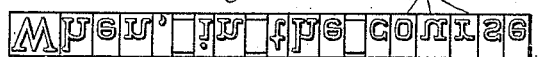
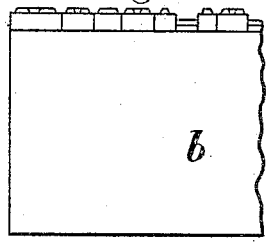
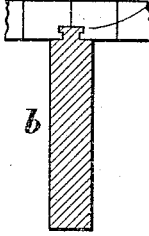
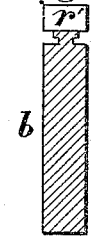
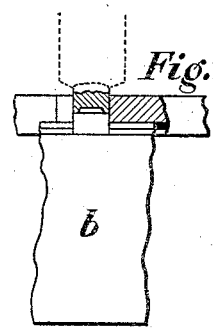
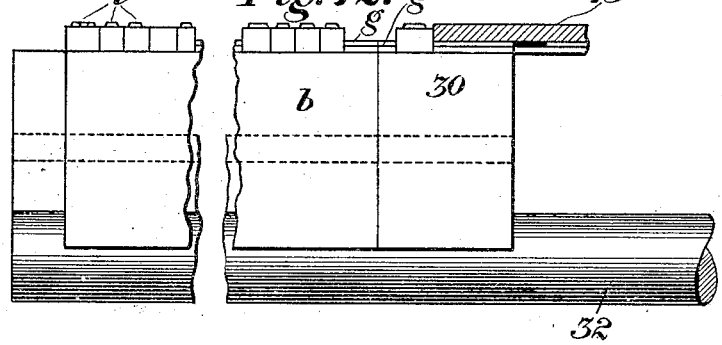
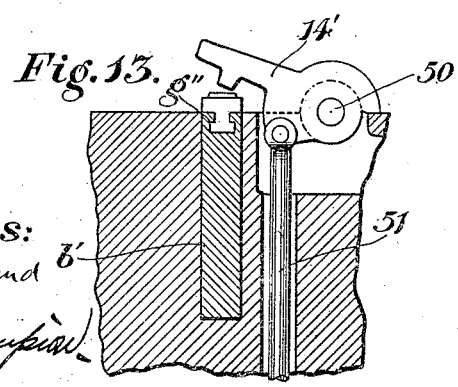
Witnesses:
Inventor;
F. H. Richards,

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF ARIZONA TERRITORY.

MACHINE FOR FORMING TYPE-BARS.

947,005. Specification of Letters Patent. Patented Jan. 18, 1910.

Original application filed January 14, 1899, Serial No. 702,124. Divided and this application filed May 3, 1900, Serial No. 15,299. Renewed September 19, 1908. Serial No. 453,821.

*To all whom it may concern:*

Be it known that I, FRANCIS H. RICHARDS, a citizen of the United States, residing at Hartford, in the county of Hartford and State of Connecticut, have invented certain new and useful Improvements in Machines for Forming Type-Bars, of which the following is a specification.

This invention relates to a machine for making typebars, and is embodied in a simple and effective mechanism whereby improved typebars of a high quality may be produced with rapidity and economy.

The typebar which this machine is adapted to make comprises a body or carrier constructed to receive, usually on one edge thereof, a series of types by an interlocking engagement between the carrier and the types, these types being distributed along the edge of the bar to form words and wordspaces, as may be desired. The regulation of the positions or the justification of the matter in a line, for the printing of which any particular typebar is adapted, is made by setting the word-groups of types at suitable distances apart along the edge of the bar. For carrying out this part of the final operation of making justified typebars such as described herein reference may be had to another application filed April 18, 1901, Serial No. 56,482.

The machine shown herein is especially designed and intended for forming typebars as set forth in my companion application Serial No. 702,124, filed January 14, 1899 of which application the present is a division. In this machine the blank will usually be fed along step by step relatively to a type-forming mechanism, by means of which the type material (preferably supplied to the machine in the form of a wire of rectangular cross-section) will be shaped into regular type, and at the same time each type thus formed may have its type-body portion interlocked with the type-carrying edge of the carrier portion of the completed typebar. In some cases this interlocking will be effected by placing the type-body in engagement with the outside of a T-shaped or other suitable form of type-guide rib on the edge of the typebar body, and in other cases said type body will be forced into a suitable retaining groove formed in the same edge of said typebar body.

My improved typebar-machine is distinguished from all others of which I have knowledge by the fact that an essential feature thereof is the provision of mechanism for compressing the individual typeblank on to and into engagement with a suitable type-support to form a type engaged or interlocked with such support. This act of compressing the material or blank results not merely in the compression of the material into engagement with the support but also in the formation of the type itself, and hence the molding of the type and the interlocking thereof with the support are in practice simultaneous and are the result of one operation.

In the preferred construction the type-support or type-bar body on to which the type-heads or type proper are molded will be so constructed that the finished types will be capable of being shifted or slid along such body, and hence I make use of a typebar in which there is a type-guide of uniform character throughout its length, this guide being preferably on one edge of the typebar body, and being either a rib or tongue projecting therefrom, or a groove or channel cut therein, and on to or into which the material of the type-blank may be compressed and engaged or interlocked therewith.

In practicing my invention with mechanism embodying dies and a coöperative mold I am enabled to form a type in which the head or type proper thereof is separate from, but is interlocked with, a suitable supporting body, and hence I consider within the scope of my invention any mechanism suitable for the purpose of molding a head formed from cold metal on to said body. As the present machine is intended, however, more particularly for forming typebars it will be evident that it should embody mechanism for forming a series of such type interlocked or engaged with the typebar body. When these separate type are shiftable longitudinally of the typebar body—usually on a type-guide such as hereinbefore mentioned—they may be spaced in any desired manner, and hence the different groups of characters, ordinarily word-groups, may be properly justified, as is customary in the production of other kinds of typebars.

The machine embodied in the present invention will comprise as an important feature thereof type-forming mechanism coöperative with a type-support or typebar body to compress on to, and hence form on, the latter and in engagement therewith a type or row of types which may be molded into place in any proper manner as, for instance, by a suitable mold coöperating with the die. Here the type-support or typebar body will form a wall corresponding to one wall of a mold, and the other walls of the mold if a separate mold-box is used may coact with such support or body to form a space substantially inclosed except at one side where a type-die is to be brought against type material supplied thereto. One or more walls of this mold may be movable not only for the purpose of permitting the removal of a finished type, but also for varying the size of the mold to permit the production of different sizes of type—that is, type of different widths when finished. The employment of a mold is particularly advantageous since its side walls serve to confine the material when pressed upon by the die, and hence to mold a type head of definite size. The need of trimming the head is obviated in a very large measure when the mold is employed. I do not, however, in the present application claim the broad features herein illustrated of a mechanism for producing the described composite typebar, since an organization of such mechanism is shown, described, and claimed in the application, which is a division of this present application, filed on July 13, 1901, Serial No. 68,137, which is a division of the parent application of this present application. In a complete mechanism for producing such a typebar it is desirable to feed the typebar body on to which the type are molded different distances, step by step, according to the size of the type to be formed, and a construction operative in this manner is shown herein. Moreover, while the type material may be supplied to the type-making point under the die in any proper manner I deem it desirable to feed up thereto a type-blank rod, preferably rectangular in cross-section, from which rod type-blanks will be severed or sheared, these type-blanks being of such lengths as may be necessary for the formation of the desired type. Hence this rod may also be fed different distances, and a variable-feed device is provided herein for this purpose.

As before mentioned, at least one side of the mold in which the type is formed in the event of the employment of a separate molding device in combination with the die should be movable, and in this case several walls of the mold are shiftable in different directions, but at least one of them is capable of adjustment for the purpose of varying the size of the mold according to the nature of the type to be formed therein, this wall being shifted by suitable feed mechanism to one point for the formation of a narrow type, and to other points for the molding of medium-width and wide types. The mold itself will be separable, and the several parts thereof may have, in the simplest construction now known to me, many different functions, one of them being operative—in the present case for varying the size of the mold—for pushing out of the mold a finished type and as a convenient means for shearing off from the type-blank rod a type-blank of any length, which may be determined by the feed mechanism.

In connection with the illustrated mold I have also provided suitable means for permitting the escape of excess material therefrom, it being understood that in all cases it is desirable to supply to the mold type material or a type-blank containing a quantity of metal slightly in excess of that necessary to make the type for which the mold may be adjusted. In this construction, therefore, I have illustrated means for permitting the escape of this surplus, an outlet-opening being shown herein and closed by a resistance device or plug held in place in any suitable manner—as by a spring—the force of this being overcome by the surplus metal when the type is formed.

The above-mentioned and other novel features of my invention not hereinbefore particularly referred to will be described in detail in the accompanying drawings, in which—

Figure 2:
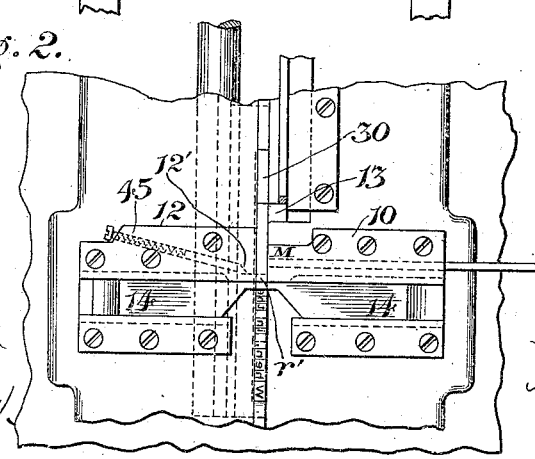

Figure 1 is a sectional end elevation, partly in outline, of a portion of a typebar-forming apparatus, illustrating a simple form of mechanism for carrying my invention into effect and producing my improved typebar. Fig. 2 is a detail plan view of a portion of the apparatus, showing the mold and coacting devices. Fig. 3 is a side elevation, with parts broken away and with the rod-feeding device removed, of my improved apparatus. Fig. 4 is an enlarged plan illustrating a complete typebar constructed in accordance with my present invention. Fig. 5 is a side elevation of a portion of the same. Fig. 6 is a transverse section of the same. Fig. 7 is a transverse section of the typebar body, illustrating two oppositely-disposed slides in position to form one end wall of the mold. Fig. 8 is a transverse section of the typebar body with a type-blank in position thereon before compression. Fig. 9 is a similar view illustrating said type-blank compressed by a type-die. Fig. 10 is a detailed side elevation, partly in section, corresponding to Fig. 8, and showing the type-blank located in place and held endwise between the transverse walls or plungers of the mold. Fig. 11 is a detailed sectional side elevation corresponding to Fig. 9, and illustrates the formation of the finished type by the compressing action of the type-die. Fig. 12 is a side elevation, broken in the center, illustrating the typebar body and its feed-rod, said body having thereon a series of finished type, this view illustrating the manner in which the last type of the row is formed on a feed-slide alined with the typebar body and having a type-guide similar to that of such body in order to permit the sliding of the finished type off from the feed-slide and on to the typebar body. Fig. 13 is a sectional detail illustrating a modification of the invention, in which the typebar body is grooved or channeled instead of having a tongue or rib projecting therefrom, and in which also a different type of end wall is provided for closing one end of the mold.

Similar characters designate like parts in the different figures of the drawings.

The several operative parts of the mechanism may be mounted on any proper framework, such as that indicated in a general way by A, Fig. 3. Upon this framework I prefer to mount orbitally-movable rotary type-dies, which may be carried by a rotating turret substantially in the manner shown and described in my prior patent, No. 403,216, granted May 14, 1889, to which reference may be had for a more detailed description of the several parts. In the illustration this turret is mounted for rotation between end frames, such as 2, rising from the main framework A, and in this case the turret carries four shafts, such as 3, on which are carried die-wheels, such as w, provided with type-dies, such as d. Each of the shafts 3 is also shown as carrying a suitable starting-arm, such as s, as in my before-mentioned patent. For the purpose of starting the starting-arms, and hence the shafts of the die-wheels and the dies, rotating I may make use of the starting-latches, which may be of a simple type, as indicated at l, the latches shown being spring-pressed ones, which will start the rotation of the shafts and will be reset or returned to their normal positions by the starting-arms s, substantially in the manner described in said patent. As many of these spring-pressed latches may be used as there are type-dies on the die-wheels, but only four are illustrated herein.

It will be obvious that the main shaft 4, carrying the several members of the turret T, should be rotated in order to permit the rotation of the die-wheels when any starting-arm comes into contact with a latch that may be set, and for the purpose of rotating said turret I have shown on said shaft 4 a crank or handle 4', which, it will be understood, will be given one turn each time a latch is set.

One of the end pieces 2 is shown provided with a suitable internal gear, such as 7, with which the teeth of the gear wheel segments 8, attached to the die wheel shafts, will mesh when said shafts are started rotating. The gear-segments 8 on the shafts 3 will be rotated selectively one at a time as the latches l are selectively operated, and when any gear-segment, its shaft, and the die wheel thereon have been started rotating at the proper point such rotation will be stopped in some suitable manner, as, for example, by a spring-pressed detent 9 coming in contact with a flattened portion of the hub of the gear-segment.

The type-mold in which each of the types is formed will comprise the die, the type receiving face of the type support and members having walls or faces for forming side walls of the mold, the type support presenting in its type receiving face the bottom wall of the mold. The type will be formed in this type mold and will preferably be engaged with the type-support while being made. A side-mold suitable for this purpose is indicated in a general way by M, and is shown made up of a number of separable parts, two sides of which are formed by fixed walls, such as 10 and 12, in juxtaposition with the sides of the type-support or typebar-body, which is indicated in a general way by b, and which body or support constitutes a part of the mold affording the bottom wall thereof. A block a having a recess for the type-bar body piece b affords, when the machine in the present illustration is in operation, suitable means holding the type-bar body at the working point of the machine. In the preferred construction at least one end of the mold will be formed by a movable wall, which will be shiftable for the purpose of permitting removal of the finished type and which may also serve as a means for varying the size of the mold, said wall being in this case part of a slide 13 adjustable to different positions according to the width of the type to be formed. The other or forward end of the mold may be closed by one or more members shiftable toward and from their mold-closing positions, their movements in this case being transverse to the typebar body and they being so constructed as to fit snugly over the type-guide on the typebar body and completely close such end of the mold. These two slides, which form said end wall of the mold, are complementary to and in alinement with each other in the preferred construction and are designated in a general way by 14—14. Said slides may be normally spring-pressed away from the typebar body to clear the latter, suitable springs, such as 15, being employed for this purpose, and said slides may be power-operated, as by means of slides 16—16, having cam-faces 16' for forcing the slides 14 together to close the rear end of the mold.

The operating slides 16—16 will be actuated in some suitable manner, but in this case I prefer to control them directly from the main shaft 4 of the turret, and hence I have shown on said shaft a pinion 17, which meshes with an idler 18, properly supported on one of the end pieces 2 of the framework, said idler meshing in turn with pinions 19, carried on corresponding ends of shafts 20, journaled in bearings carried by hangers 21, depending from the under side of the base or bed 22 of the framework, said shafts 20 also having thereon suitable cams, such as 20', coacting with rolls, such as 16'', on the slides 16. It will be understood that although only one set of operating connections from the idler 18 is shown the other set does not appear in Fig. 3, because it is located in the rear of the first set and corresponds exactly thereto. It will be apparent that when the crank 4' of the main shaft 4 is turned the slides 16, and hence the mold-slides 14, will be operated in unison by the intermediate driving connections.

The inner ends of the mold-slides 14, where they coöperate with the adjacent face of the typebar body b, are so shaped as to completely close the forward end of the mold, (see Fig. 7,) and when the typebar body has thereon a type-guide in the form of a projecting rib or tongue, such as the T-shaped tongue g, the under sides or edges of the mold-slides 14 will be so shaped as to form, when in contact with each o'her, a similar T-shaped recess, into which the rib g will fit. In the present construction it is intended that when the handle 4' is in the position shown in Fig. 3—which is the normal position of the handle—the mold-slides 14 shall be open, and hence clear of the typebar body and its guide, for the purpose of permitting a finished type to be forced out of the mold and slid along the type-guide to a position beyond—that is, in front of—the mold-slides 14.

The plunger or slide on which that mold-wall is formed which forms the adjustable mold wall will also be of some suitable construction. In this case the end of the plunger farthest from the mold-wall is connected to an eccentrically-disposed pin or stud 25', secured to a short spindle 25, suitably journaled in the base 22 and having secured thereto an operating handle or lever, such as 26, from which projects a pin or detent 26'. The body of the lever 26 is resilient in order to permit a slight raising and lowering of the detent-pin 26', which latter in this case will have an extreme range of movement between two stops 27', depending from a projection or plate 27 of the framework. In the under side of this plate there may be a series of recesses, such as 27'', into any one of which the end of the pin 26' may be slipped for the purpose of locking the pin and the lever temporarily in place, the distance between the stops 27' correspond to the extreme range of movement of the slide 13, and hence of the mold-wall, while the distances between the locking-recesses 27'' represent unit-spaces, as does also the interval between the right-hand stop-pin 27', as seen in Fig. 3, and the locking-recess adjacent thereto.

The four shafts 3 are intended to carry dies of four different widths, and the right-hand stop-pin 27' and the locking-recesses 27'' are so located and spaced as to permit the adjustment of the slide 13, and hence of the mold-wall, to set the latter and vary the size of the mold so as to enable the latter to control the production of finished type of four different widths. Hence if the lever is shifted from its normal position—which is in contact with the right-hand pin 27'—until the pin 26' reaches the first locking-recess 27'', the wall will be set to form a mold-space one unit wide, and if the lever is shifted to the second, third, or fourth recess 27'' of course the mold will be two, three, or four units wide, as the case may be. The extreme movement of the lever 26 from one stop-pin 27' to the other is intended to be independent in point of time of the movement just described, and such extreme movement is in this case for the purpose of shifting the finished type along the type-guide of the typebar body b and locating it in its proper or final position on the typebar body, unless re-positioning thereof should become necessary during justification.

In the construction illustrated herein not only does the typebar body b have a type-guide g, but so does the actuating device or feed-slide by means of which such typebar body is shifted or fed. This feed-slide will be of some suitable type, but preferably will be substantially of the construction shown herein. Here it is a vertically-disposed slide 30, alined with and substantially of the same cross-section as the typebar body b, and adapted to traverse the type-bar recess in the block a. Said slide also has a type-guide g' similar to the type-guide g. In this case the feed-slide 30 is connected to and is operated in unison with a feed-screw 32. This feed-screw is operated in the present instance by means of a bevel-pinion 33, which slides said feed-screw lengthwise but is connected thereto in some suitable manner so as not to travel longitudinally therewith. The pinion 33 may in turn be operated by another pinion 34, carried by a spindle 35, suitably mounted and having thereon an operating-wheel or dial 35', containing an index i, coacting with a pointer 36 on the fixed portion of the framework. By turning this index-wheel the feed-slide 30, and hence the typebar body b, may be fed forward any required distance equal to the width of the next type to be formed, it being understood that the graduations of the index *i* are equidistant from one another.

In the construction shown the slide 13 coacts, as before stated, with the typebar body to close the rear end of the mold M at the proper time, and it is also intended to coact with the feed-slide 30 for the same purpose. For this reason I deem it desirable to support the slide 13 on the type-guide *g'* of the feed-slide 30, and this construction is shown clearly in detail in Fig. 12, from which it will be seen that said slide 13 is guided on the projecting rib *g'*. The object of this is to permit the formation of the last type of a complete series on the feed-slide 30 in exactly the same manner as the preceding type of such series have been formed on the typebar body *b*. After being formed the finished type will be shifted from the slide 30 by the slide 13 and on to the typebar body *b*.

The material from which the type are to be formed will be some suitable for the purpose and will be delivered at the type making point under the die in a proper manner, but I prefer to feed intermittently a type-blank rod, such as *r*, preferably square in cross-section, which rod is herein illustrated as fed by means of a pair of feed-rolls *f—f'*, the former of which has a graduated periphery or index *i'*, composed of equidistant graduations with which a suitable pointer on the framework—such, for example, as the finger shown at 40—coöperates.

The feed-roll *f* may be turned by a handle 41 to feed the rod *r* any required distance, which, it will be understood, may correspond to the width of the type to be formed, the graduations of the feed-roll *f* being unit-distances corresponding to those of the index *i* and also to those between the recesses 27''. When a proper length of the rod has been fed forward, a type-blank *r'* will be severed therefrom in some suitable manner. The slide 13 shown in the present organization offers a convenient means for shearing off, consecutively, the separate type-blanks although it will be obvious to those familiar with the art of stamping and die-making that the die itself may be utilized as a means for shearing off a type-blank from the stock immediately prior to the operation of the die in producing a type. The amount of material so cut off may vary, as just stated, according to the size of type to be formed, but in every case the type-blank should be of a size slightly in excess of that required for making the finished type. This excess of material will be disposed of in some suitable way, preferably the surplus will be permitted to escape from an outlet-opening, such as 12', in the mold-wall 12 when an independent type-mold is used, this opening being controlled by a spring-pressed resistance device or plug, such as 45, which will be pushed back by the metal escaping through the outlet-opening 12' when a type-die is brought down upon the type-blank or material in the mold. This surplus will be sheared off—in this case from the finished type—by the slide 13 as soon as said type has moved forward out of the mold-space, that edge of the outlet-opening 12' which is adjacent to the finished type serving as a shearing device effective for this purpose.

The operation of an apparatus such as has been described hereinbefore for producing an improved typebar of the class specified is as follows: It will be assumed that there is a finished type directly under the die and hence in the mold-box to be disposed of. The lever 26 is first turned from the extreme right-hand position in Fig. 3 to its extreme left-hand position, and the finished type is shifted along the type-guide and out of the mold-space, it being understood that at this time the mold-slides 14 are withdrawn from the typebar body, the finished type then being clear of the mold-space and just beyond the forward side of the forward wall of the mold in order that it may clear the slides 14. The lever 26 is then returned to its normal position to the right in Fig. 3. Immediately thereafter one of the key-operated latches 1 may be actuated, the latch set corresponding to the type to be formed. Thereupon the handle 41 should be operated to turn the feed-roll *f* a distance corresponding to the width of the type which the latch just operated represents, and thereupon the rod *r* will be fed forward, and a portion of the rod will project over the typebar body in a position somewhat in the rear of the mold-space. The lever 26 is then shifted from its right-hand position, as indicated in Fig. 3, until the detent-pin 26' comes opposite and slips into that recess 27'' which corresponds to the width of the type to be formed, whereupon the lever 26 and the slide 13 cause the shearing off of a type-blank *r'* from the rod *r* and the location of such blank in the plane of movement of the dies, and hence in the mold-space. The handle 4' may now be turned to start the turret T rotating, and when the proper starting-arm comes in contact with the latch which was set such starting-arm and its shaft and die-wheel will begin to rotate, and this rotation will continue until the orbitally-movable rotary type-die corresponding to the latch selected is brought with a rolling action into contact with the type material or blank and compresses the latter in the mold, thus simultaneously forming a type corresponding to such type-die and engaging or interlocking said type with the type-guide on the typebar body or on the feed-slide, as the case may be. Just before the compressing action, however, which is illustrated clearly in Figs. 9 and 11, the operating connections from the pinion 17 cause the slides 16 to be raised to bring the mold-slides 14 together, and thus close the forward wall of the mold-box. Each time the handle 4' is operated it should be given a complete turn, during the first part of which the starting-arm will commence rotating and afterward will reset the operated latch, and during the last part of which the mold-slides 14 will be opened again. This series of operations may be repeated at will to produce a series of selected types of varying widths, which may be properly spaced along the typebar body, either by leaving a blank space between the separated groups of words, as shown in Figs. 4 and 5, or by forming quads between the word-groups in the same manner that the type themselves are formed. Manifestly the spaces which may be left between the word-groups or other groups may be of varying widths according to the manner in which the several parts are operated. In forming the last type of a series, there not being sufficient space at the extreme end of the typebar body to carry out the several operations just described, the type-blank is operated upon while on the type-guide of the feed-slide 30 and after being finished is shifted to its proper position at the end of the line on the typebar body, substantially as before described. The type t, formed in this manner, are perfect substitutes for the type or linotype ordinarily used in printing operations, but may be readily shifted along the body of the typebar after completion, for the purpose of re-spacing or justifying the several groups of type. This will be evident when it is noted that during the formation of the type the latter is firmly engaged and interlocked with a guide of uniform cross-section extending throughout the length of the typebar body, and hence any sliding of the type along such guide will not impair the character of the printing to be done thereby.

In Fig. 13 I have illustrated at b' a modification of the typebar body, in which the type-guide has a channel or groove g'', into which the type-blank is forced by the compressing action of the type-die when the latter is brought down thereonto. With such a type-bar body as this a different style of mold-wall will be employed, this being shown formed on a swinging arm, such as 14', which may be carried by a rock-shaft 50 and intermittently oscillated by a rod 51, controlled by a suitable actuating means, all of the other parts necessary to coöperate with the devices shown in this modification may be substantially similar to those hereinbefore described.

Having described my invention, I claim—

1. The combination with means holding a type-support, of type-forming mechanism embodying a side-mold coöperative with successive portions of said type-support for forming a type-mold upon said support, and a type-die coöperative with said type-mold for forming a type-blank into a type engaged with said type-support.

2. The combination with means holding a type-support, the support having a type-guide, of type-forming mechanism embodying a side-mold adapted to coöperate with successive portions of said type-guide in forming a type-mold upon such support, and a type-die coöperative with said type-mold for forming a type-blank into a type interlocked with said type-guide.

3. The combination with means holding a type-support, of type-forming mechanism embodying a separable side-mold adapted to coöperate with successive portions of said type-support in forming a type-mold upon such support, and a type-die coöperative with said type-mold for forming a type-blank into a type engaged with said type-support.

4. The combination with means holding a type-support, and with means for supplying, in succession, the individual type-blanks, of a side-mold coöperative with one face of said type-support in forming a type-mold upon such support, and a type-die coöperative with said type-mold for compressing said type-blanks into engagement with said support to form a type thereon.

5. The combination with means holding a type-support and with feeding means for the type-support, of a side-mold coöperative with one face of said support for forming a type-mold upon said support, and selectively-operative type-dies coöperative respectively with said type-mold for forming type-blanks into successive type engaged with said typebar body.

6. The combination with means holding a typebar body, the body having a type-retaining guide, and with a type-die, one of said members being operable toward and from the other, and means for shifting the type from under the die, of means associated with said typebar body for limiting the flowage of the type material in directions transverse to the type-forming movement of such movable member.

7. The combination with means holding a type-support, of a side-mold adapted to coöperate with successive portions of said type-support in forming a type-mold and having an adjustable wall, and a type-die coöperative with said type-mold for forming type material into a type engaged with said type-support.

8. The combination with means holding a typebar body, and a side-mold coöperative with said typebar body for forming a type-mold and having an adjustable wall shiftable longitudinally of said typebar body, and a type-die coöperative with said type-mold for forming type material into a type engaged with said typebar body.

9. The combination with means holding a typebar body, of a side mold coöperative with said body in forming a side-mold and having an adjustable wall shiftable longitudinally of said typebar body, adjusting means for setting said wall in different adjusted positions, and a type-die coöperative with said mold for forming type material into a type engaged with said typebar body.

10. The combination with means holding a typebar body, of a side mold coöperative with said body in forming a type-mold and having an adjustable wall shiftable longitudinally of said body, and a plurality of type-dies of different widths coöperative selectively with said typebar body.

11. The combination with means holding a type-support, of a separable side-mold coöperative with said type-support in forming a type mold and having a plurality of walls movable in different directions, and a type-die coöperative with said type-mold for forming type material into a type engaged with said type-support.

12. The combination with means holding a type-support, of a separable side-mold coöperative with said type-support in forming a type-mold and having a pair of walls movable transversely to the typebar, and a type-die coöperative with said type-mold for forming type material into a type engaged with said type-support.

13. The combination with means holding a type-support, of a separable side-mold coöperative with said type-support in forming a type-mold and having a pair of oppositely-movable members forming one wall thereof, and a type-die coöperative with said type-mold for forming type material into a type engaged with said type-support.

14. The combination with means holding a typebar body, of a separable side-mold coöperative with said support in forming a type mold and having oppositely-movable walls disposed transversely to the typebar body, and a type-die coöperative with said type-mold for forming type material into a type engaged with said support.

15. The combination with means supporting a typebar body, said body having a type-guide, of a pair of members having a wall complementary to and disposed transversely to said typebar body, and adapted to fit said type-guide and coöperate with said body in forming a type-mold and to close one end of the said mold, and a type-die coöperative with the said type-mold for forming type material into a type engaged with said type-guide.

16. The combination with means holding a typebar body, said body having a type-retaining tongue, of a separable side-mold coöperative with said typebar body in forming a type-mold and having a mortised wall for fitting over said tongue and disposed transversely to the typebar body, and a type-die coöperative with said type-mold for forming type material into a type engaged with said tongue.

17. The combination with means holding a typebar body, said body having a type-guide, of a separable side-mold coöperative with said typebar body in forming a type-mold and having a shiftable wall disposed transversely to said typebar body, and adapted to fit said type-guide and close one end of the mold, and a type-die coöperative with said type-mold for forming type material into a type engaged with said type-guide.

18. The combination with means holding a typebar body, of step-by-step feed mechanism for said body, and type-forming mechanism embodying a side-mold coöperative with said type-bar body in forming a type-mold, and type-dies coöperative selectively with said type-mold for forming type material into type engaged with said typebar body.

19. The combination with means holding a typebar body, of step-by-step variable feed mechanism for said body, type-forming mechanism embodying a side-mold coöperative with said typebar body in forming a type-mold, and type-dies coöperative selectively with said type mold for forming type material into types engaged with said typebar body.

20. The combination with means holding a typebar body and with feed mechanism for said body, of a side-mold coöperative with said typebar body in forming a type-mold and having an adjustable wall disposed transversely to said body, type-dies coöperative selectively with said type-mold for forming type material into type engaged with said typebar body, and a variable-feed device for adjusting said wall to different positions.

21. The combination with means holding a typebar body and with feed mechanism for said body, of a side-mold coöperative with said typebar body in forming a type-mold and having an adjustable wall disposed transversely to said body, type-dies of different widths coöperative selectively with said type-mold for forming type material into type engaged with said typebar body, and a variable-feed device operative for adjusting said wall to a position corresponding to the width of the die for the type to be formed.

22. The combination with means holding a typebar body and with feed mechanism for said body, of means for feeding a type-blank rod, type-forming mechanism embodying a side-mold coöperative with said typebar body in forming a type-mold, and type-dies coöperative selectively with said type-mold for forming said type-blanks into type engaged with said typebar body.

23. The combination with means holding a typebar body and with feed mechanism for said body, of means for feeding a type-blank rod, type-forming mechanism embodying a side-mold coöperative with said typebar body in forming a type mold and having a type-blank-severing wall, and type-dies coöperative selectively with said type-mold for forming the severed typebar blanks into type engaged with said typebar body.

24. The combination with means holding a typebar body and with feed mechanism for said body, of means for feeding a type-blank rod, type-forming and type-blank-severing mechanism embodying a side-mold coöperative with said typebar body in forming a type-mold and having a type-blank-severing wall shiftable longitudinally of the typebar body, and type-dies coöperative selectively with said type-mold for forming the severed type-blanks into type engaged with said typebar body.

25. The combination with means holding a typebar body and with feed mechanism for said body, of means for feeding a type-blank rod, type-forming and type-blank-severing mechanism embodying a side-mold coöperative with said typebar body in forming a type-mold and having a variable-movement adjustable type-blank-severing wall movable longitudinally of the typebar body, and type-dies coöperative selectively with said type-mold for forming the severed type-blanks into type engaged with said typebar body.

26. The combination with means holding a typebar body, and with feed mechanism for said body having a typebar-actuating feed-slide, of means for feeding a type-blank rod, type-forming mechanism embodying a side-mold coöperative with said typebar body in forming a type-mold and having a wall movable on said feed-slide, and type-dies coöperative with said type-mold for forming said type-blanks into type engaged with said typebar body.

27. The combination with means holding a typebar body, and with feed mechanism for said body having a typebar-actuating feed-slide, of means for feeding a type-blank rod, means for severing the type blanks, and type-forming mechanism embodying a side-mold coöperative with said typebar body in forming a type-mold and having a type-blank-severing wall movable on said feed-slide, and type-dies coöperative with the type-mold for forming the severed type-blanks into type engaged with said typebar body.

28. The combination with means holding a typebar body, said body having on one edge thereof a type-guide, and with feed mechanism for said body having a typebar-actuating feed-slide provided with a type-guide corresponding to that of the typebar body, of type-forming mechanism embodying a side-mold coöperative with said typebar body and said feed-slide in forming a type-mold, and type-dies coöperative selectively with said type-mold for forming type material into type engaged with one of said type-guides.

29. The combination with means holding a typebar body, said body having on one edge thereof a type-guide, and with feed mechanism for said body having a typebar-actuating feed-slide provided with a type-guide corresponding to, and alined with that of, the typebar, of type-forming mechanism embodying a side-mold coöperative with said typebar body in forming a type-mold and having a movable wall coacting with said feed-slide, and type-dies coöperative selectively with said type mold for forming type material into type engaged with one of said type-guides.

30. The combination with means holding a typebar body, of type-forming mechanism embodying a side-mold coöperative with said typebar body in forming a type-mold and having a movable wall, means for imparting two strokes to said movable wall, one of which is a stroke of variable length, and type-dies coöperative selectively with said type-mold for forming type material into type engaged with said typebar body.

31. The combination with means holding a typebar body and with feed mechanism for said body, of type-forming mechanism embodying a side-mold coöperative with said typebar body in forming a type-mold and having a movable wall, means for imparting a fixed stroke to said movable wall and also a variable stroke less than such fixed stroke, and type-dies coöperative selectively with said type-mold for forming type material into type engaged with said typebar body.

32. The combination with variable-feed mechanism for feeding a typebar body, of a variable-feed device for feeding a type-blank rod, means for severing said rod into type-blanks, and type-forming mechanism embodying a side-mold coöperative with said typebar body in forming a type-mold and having a variable-feed type-blank-feeding wall, and type-dies of different widths coöperative selectively with said type-mold for forming said type-blanks into type engaged with said typebar body.

33. The combination with means holding a typebar body, of type-blank-severing means, a side-mold coöperative with said typebar body, in forming a type-mold, and type-dies of different sizes coöperative selectively with said type-mold for forming the type-blanks into type engaged with said typebar body, and variable feed mechanism for feeding the typebar body and a type-blank rod variable distances corresponding to the size of the selected type-die.

34. The combination with means holding a typebar body, of type-blank-severing means, a side-mold coöperative with said typebar body in forming a type-mold and having a wall movable longitudinally of the latter, and type-dies of different sizes coöperative selectively with said type-mold for forming the type-blanks into type engaged with said typebar body, and variable-feed mechanism for feeding the typebar body, the movable wall of the mold, and a type-blank rod variable distances corresponding to the size of the selected type-die.

35. The combination with means holding a typebar body and with feed mechanism for said body, of an adjustable side-mold coöperative with one face of said typebar body in forming a type-mold, means for varying the size of said type-mold to correspond to the sizes of different dies, and a plurality of type-dies of different sizes coöperative selectively with said type-mold for forming type material into type engaged with said typebar body.

36. In a type-forming mechanism, the combination with an adjustable type-mold, of means for varying the size of said mold to correspond to different sizes of type-dies, and a plurality of type-dies of different sizes coöperative selectively with said mold for forming type material into type of different sizes.

37. The combination with means holding a typebar body, of type-molding and type-shifting mechanism embodying a side-mold coöperative with the typebar body in forming a type-mold, and a die coöperative with the type mold, said mechanism being operative for first molding a type-blank into a finished type engaged with said typebar body and then shifting the finished type along said body.

38. The combination with means holding a type-support of a side-mold coöperative with said type-support in forming a type-mold and having an overflow-opening, and a type-die coöperative with said type-mold for forming type material into a type engaged with said type-support and for forcing surplus material through such overflow-opening.

39. The combination with means holding a type-support, of type-forming mechanism embodying a side-mold coöperative with said type-support in forming a type-mold and having an overflow-opening, and a type-die coöperative with said mold for forming type material into a type engaged with said type-support and for forcing surplus material through such overflow-opening, said type forming mechanism embodying means for removing the surplus from the finished type.

40. The combination with means holding a type-support, of a side-mold coöperative with said type-support in forming a type-mold and having an overflow-opening, a type-die coöperative with said type mold for forming type material into a type engaged with said type-support and for forcing surplus material through such overflow-opening, and a resistance device normally closing the outlet of said overflow-opening and adapted to be actuated by the surplus material discharged from such opening.

41. The combination with means holding a type-support, of type-forming mechanism embodying a separable side-mold coöperative with the support in forming a type-mold, a type-die coöperative with the type-mold for forming a type-blank into a type engaged with the support, and means for shifting a type out of the type-mold.

42. The combination with means holding a type-support, of type-forming mechanism embodying a side-mold coöperative with the support in forming a type-mold, a type-die coöperative with the type-mold for forming a type-blank into a type engaged with the support, and means for feeding the support to shift the type out of the side-mold.

43. The combination with means holding a type-support, of type-forming mechanism embodying a side-mold coöperative with the support in forming a type-mold, a type-die coöperative with the type-mold for forming a type-blank into a type engaged with the support, and a plunger for shifting the type.

44. The combination with means holding a type-support, of a type-forming mechanism embodying a separable side-mold coöperative with the support in forming a type-mold, a type-die coöperative with the type-mold for forming a type-blank into a type engaged with the support, a plunger for shifting the type, and means for feeding the type-support.

45. The combination with means holding a type-support, of type-forming mechanism embodying a side-mold coöperative with the support in forming a type-mold, a type-die coöperative with the type-mold, an auxiliary member forming a continuation of the type-support, and means for shifting a formed type from the auxiliary member onto the type-support.

46. The combination with means holding a type-support, of type-forming mechanism embodying a side-mold coöperative with the support in forming a type-mold, a type-die coöperative with the mold, a feed-slide forming a continuation of the type-support, and means for shifting a formed type from the feed-slide onto the type-support.

47. The combination with means holding a type-support, of type-forming mechanism embodying a side-mold coöperative with the support in forming a type-mold, a type-dye coöperative with the type-mold, a feed-slide forming a continuation of the type-support, and a plunger constituting one side of the type-mold for shifting a formed type from the feed-slide onto the type-support.

48. The combination with means holding a type-support, of type-forming mechanism embodying a side-mold coöperative with the support in forming a type-mold, a type-die coöperative with the type-mold, a feed-slide forming a continuation of the type-support, and an adjustable plunger constituting one side of the type-mold for shifting a formed type from the feed-slide onto the type-support.

49. The combination with means holding a type-support, of a type-forming mechanism embodying a side-mold adapted to coöperate with the type-support in forming a type-mold, and a type-die coöperative with the type-mold for forming a type-blank into a type and engaging the same with the support.

50. The combination with means holding a type-support, of a type-forming mechanism embodying a side-mold coöperative with the support in forming a type-mold, a type-die coöperative with the type mold for forming a type-blank into a type engaging with the support, and means for feeding the support to shift the type out of the mold and bring another portion of the support into coöperative relation with the mold.

51. A type-mold having a yielding, resistance-opposing outlet for the flow of surplus material, and means to remove the surplus material.

52. A type-mold having a yielding outlet for the flow of surplus material, and means to remove the surplus material.

53. A type-mold having a spring-controlled outlet for the flow of surplus material, and means to remove the surplus material.

54. A type-mold having a spring-pressed plug 45 for controlling the outflow of surplus material from the mold, and means to remove the surplus material.

55. The combination with a type-mold having a yielding, resistance-opposing, outlet for the flow of surplus material, of a type-die adapted to coöperate with the type-mold to form a type from a blank, and means to remove the surplus material.

56. The combination with a side-mold having a yielding, resistance-opposing, outlet for the flow of surplus material, of means holding a type support located in position to form the bottom wall of said mold, and a plurality of selective type-dies adapted to coöperate with the mold to form from proper blanks a succession of types engaged with such support.

57. The combination with a type-mold having a yielding, resistance-opposing, outlet for the flow of surplus material, of means holding a type support located in position to form the bottom wall of said mold, a plurality of selective type-dies adapted to coöperate with the mold to form from proper blanks a succession of types engaged with such support, and means for causing a relative feed to thereby shift a formed type away from the working point.

58. The combination with revoluble type forming dies, of a mold, an adjustable slide forming one wall of the mold, and constituting a shear, and means for feeding stock across and into the path of the slide whereby the forwardly moving slide may shear a blank from such stock and carry the same into the mold.

59. The combination with means holding a type support, of a mold coöperative with the support, an adjustable reciprocatory slide forming one wall of the mold, and adapted to sever a blank from the stock upon its forward movement, and means for feeding stock across and into the path of the slide whereby the forwardly moving slide may shear a blank from such stock and carry the same into the mold.

60. The combination with means holding a type support, of a feed slide for feeding such support, a mold coöperative with the type support, the face of said support forming the bottom wall of the mold, an adjustable slide forming one wall of the mold and reciprocatory in line with the upper edge of said support and the feed slide and adapted on its forward movement to shear a blank from such stock and carry the same into the mold, and means for feeding stock across and into the path of the said forwardly moving slide.

61. The combination with means holding a type support, of a feed slide for feeding such support, a mold coöperative with the type support, the face of said support forming the bottom wall of the mold, an adjustable slide forming one wall of the mold and reciprocatory in line with the upper edge of said support and the feed slide and adapted on its forward movement to shear a blank from such stock and carry the same into the mold, and means for feeding stock across and into the path of the said forwardly moving slide, said mold and adjustable slide engaging with the upper edges of said type-support and said feed slide.

62. A type-mold having a yielding resistance outlet for the flow of surplus material and a blade for severing and removing the surplus material.

63. The combination with means holding a type-support, said support being provided with a type receiving portion, of a separable mold constructed and adapted to be closed upon the type receiving portion of said support, the face of said support forming the bottom wall of the mold, mechanism for actuating said separable mold, and a blank-feed for shifting a blank into said type-mold.

64. The combination with means holding a type-support, said support being provided with a type receiving portion, of a separable mold constructed and adapted for closing upon the type receiving portion of said support, the face of said support forming the bottom wall of the mold, a blank feed for shifting a blank into said mold and upon said carrier or support, mechanism for closing said mold, mechanism for bringing said blank and a die into working relation, mechanism for opening said mold, and mechanism for shifting the worked upon blank out of the said mold and along said support.

65. The combination with a holder for a type-support, of a side-mold constructed and adapted to coöperate with successive portions of a type-support in forming a mold and having an adjustable wall, the type-support holder being effective for locating a type-support in position in the holder for forming the bottom wall of the mold, and a type-die coöperative with said mold for forming type material into a type engaged with said type-support in the holder.

FRANCIS H. RICHARDS.

Witnesses:
FRED. J. DOLE,
C. E. VOSS.